Nov. 8, 1927.

E. A. GATES 1,648,394

AUTOMOBILE BUMPER

Filed Aug. 25, 1926

INVENTOR.
ELISHA A. GATES
BY A.B.Bowman
ATTORNEY

Patented Nov. 8, 1927.

1,648,394

UNITED STATES PATENT OFFICE.

ELISHA A. GATES, OF SAN DIEGO, CALIFORNIA, ASSIGNOR OF ONE-HALF TO FRANK G. VILA, OF SAN DIEGO, CALIFORNIA.

AUTOMOBILE BUMPER.

Application filed August 25, 1926. Serial No. 131,359.

My invention relates to automobile bumpers, and the objects of my invention are: first, to provide a bumper of this class which will effectively protect the automobile on which it is mounted as well as, to a great extent, the automobile or other object encountered or bumped by the bumper; second, to provide a bumper for automobiles which is so constructed and mounted as to yield readily to a slight impact, as well as to resist and protect the automobile from a more severe collision; third, to provide a bumper of this class having series of springs, yieldable under slight impact as well as when combined with others to yield under and resist more severe impacts; fourth, to provide a bumper of this class which is balanced to a certain extent in front of and behind its supporting means; fifth, to provide a bumper of this class which will yield readily at one end when subjected to an impact at said end without distorting the bumper permanently; sixth, to provide as a whole a novelly constructed automobile bumper, and seventh, to provide a bumper of this class which is simple and economical of construction proportionate to its functions, particularly durable, and which will not readily deteriorate or get out of order.

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, which form a part of this application, in which:

Like characters of reference refer to similar parts and portions throughout the several views of the drawing.

Figure 1:
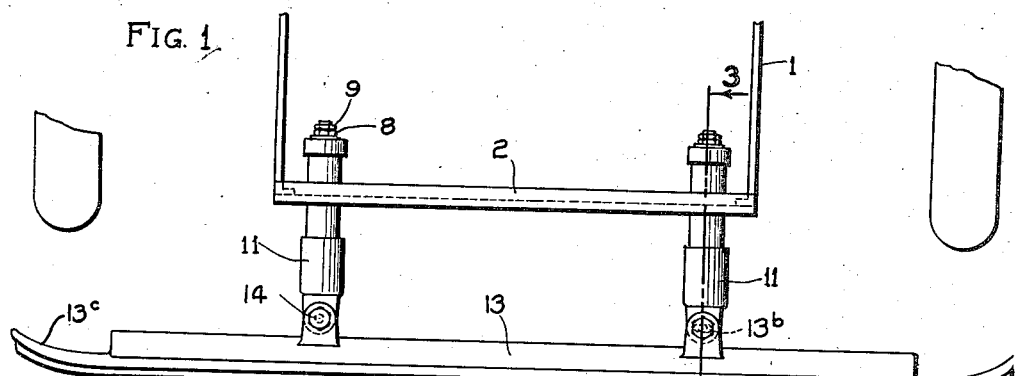
Figure 1 is a plan view of my bumper structure, mounted at the forward end of an automobile, showing the supporting brackets and the automobile wheels fragmentarily.
Figure 2:
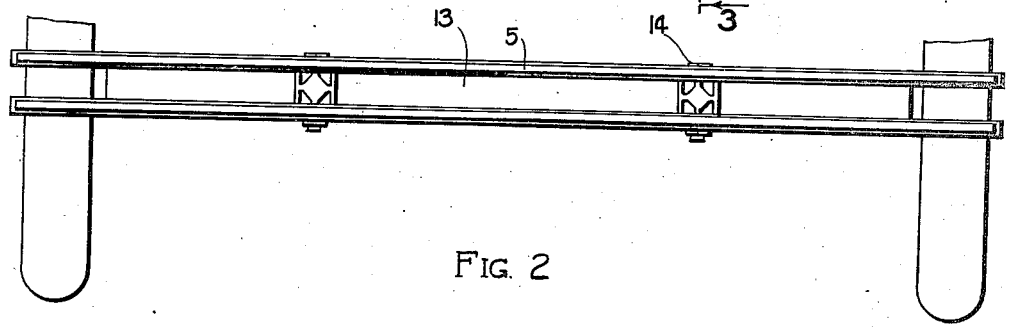
Fig. 2 is a front elevational view thereof.

The brackets 1, support 2, plungers 3, springs 4 and 5, washers 6, caps 7, nuts 8, 9 and 10, caps 11, nuts 12, bumper member 13, bolts 14, and rubber strips 15 constitute the principal parts and portions of my bumper structure.

Figure 3:
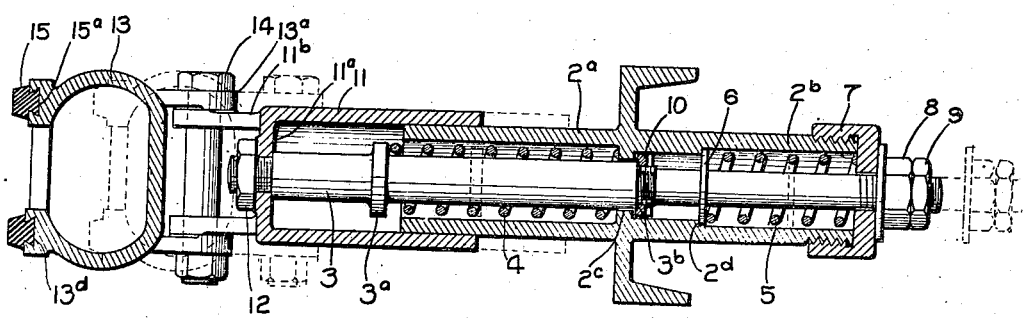
Fig. 3 is an enlarged longitudinal sectional view through one of the yieldable portions of the bumper, showing certain parts and portions in elevation to facilitate the illustration and also showing by dotted lines certain parts shifted to certain inward positions.

The brackets 1 may be of any suitable construction and are secured to the ends of the automobile frame extending beyond the body, or to any other portion of the automobile frame. At the outer ends of the brackets 1 is secured a support 2, which is preferably in the form of a horizontal channel with its flanges directed inwardly, and secured at its opposite ends to the brackets 1 in any suitable manner. Near the ends of the channel support 2 are provided forwardly and backwardly extending tubular or cylindrical portions $2^a$ and $2^b$ respectively. Through the tubular or cylindrical portions $2^a$ and $2^b$, at the opposite ends of the channel support 2, are reciprocally mounted plungers 3 which extend through openings $2^c$ in the web of the channel support between the tubular portions $2^a$ and $2^b$ thereof. The web portion of the channel 2 provides shoulders at the inner ends of the tubular portions as shown in Figure 3. Within each of the forwardly extending tubular portions $2^a$ is provided a compression spring 4 which extends around the plunger 3 therein and with its inner end engaging the shoulder at the inner end of the portion $2^a$ and its outer end engaging a shoulder or collar $3^a$ intermediate the ends of the plunger. Within each of the tubular portions $2^b$ is also provided a compression spring 5 which is positioned around the plunger 3 and between a washer 6 at its inner end and a cap 7 at its outer end, the cap 7 being secured to the outer end of the tubular portion $2^b$. The washer 6 is loosely positioned around the plunger 3 and normally engages at its inner side and at its periphery an annular shoulder $2^d$ within the tubular portion $2^b$. The forward movement of the plunger 3 is limited by a nut 8 and a lock nut 9 at the inner end of the plunger 3 which extends through a central opening in the cap 7, the nut 8 engaging the outer side of the cap. The inner or rear end of the plunger 3, as shown, is reduced, forming a shoulder $3^b$ intermediate its ends and within the tubular portion $2^b$. Against said shoulder is secured a nut 10, which may be secured in position from the inner end of the plunger by a wrench engaging notches at the outer end or side of the nut. The diameter of the nut 10 is slightly less than the restricted portion of the tubular portion 2ᵈ forming the shoulder within said tubular portion, to permit free movement of said nut beyond the shoulder 2ᵈ.

Over the outer ends of the tubular portions 2ᵃ, at the forward or outer side of the channel 2, are reciprocally mounted caps 11 in the form of cylinders provided with heads 11ᵃ at their outer ends. To these heads 11ᵃ are secured the forward reduced ends of the plungers 3 by means of nuts 12. Near the upper and lower portions of the forward or outer ends of the cylinders 11 are provided outwardly extending lugs 11ᵇ, which are positioned between and pivotally connected to lugs 13ᵃ extending backwardly from the automobile bumper member 13, said lugs being connected together by bolts 14.

It will be here noted that either the lugs 11ᵇ or the lugs 13ᵃ at one end of the bumper are transversely slotted, or slotted longitudinally with the bumper, as indicated by 13ᵇ in Figure 1 to permit either of the ends of the bumper to be shifted inwardly without unnecessary strain and distortion on any of the members of the structure.

The bumper member 13 is of C-shaped cross section with the open portion of the section extending outwardly or forwardly as shown. The opposite ends of the bumper member, however, are preferably provided with fins or more resilient portions 13ᶜ which are of less thickness than the overall thickness of the bumper member so as to provide more yieldable ends. Said fin ends are curved backwardly at their ends, as shown. At the forward sides or edges of the bumper member are provided longitudinally extending dovetail slots 13ᵈ in which are secured correspondingly shaped dovetail portions 15ᵃ of rubber bumper strips 15, the outer sides of which extend a considerable distance forwardly of the forward sides of the bumper member. The mounting of the rubber strips 15 permits the same to be readily removed and replaced by others.

When the bumper is shifted inwardly by slight impact, only the springs 4 function, said springs being preferably longer and more readily yieldable than the springs 5. When greater resistance is encountered and the bumper shifted inwardly under severe impact, the light springs 4 function first until the nuts 10 engage the washers 6, at which time the springs 5 will be compressed and both springs at each end will take up the shock of the bumper.

Though I have shown and described a particular construction, combination and arrangement of parts and portions, I do not wish to be limited to this particular construction, combination, and arrangement, but desire to include in the scope of my invention the construction, combination and arrangement substantially as set forth in the appended claims.

Having thus described my invention, what I claim as new and desire to secure by Letters Patent is:

1. In an automobile bumper structure, a supporting means, contractible supports mounted at the opposite ends thereof and extending forwardly and backwardly thereof, compression springs mounted in said contractible supports, and a bumper member pivotally mounted near its opposite ends at the outer ends of said contractible supports.

2. In an automobile bumper structure, a pair of contractible supports positioned in spaced relation with each other, a pair of sequentially actuative compression springs mounted in each of said contractible supports, and a bumper member pivotally connected to the outer ends of said contractible supports.

3. In an automobile bumper structure, a pair of contractible supports positioned in spaced relation with each other, a pair of sequentially actuative compression springs mounted in each of said contractible supports, and a bumper member pivotally connected to the outer ends of said contractible supports, the springs of each pair of springs being so arranged that the one spring of each pair will yield under slight impact, and that both springs of each pair will yield under more severe impact.

4. In an automobile bumper structure, a horizontal supporting member adapted to be mounted at one end of an automobile in transverse relation therewith, tubular portions provided at the opposite ends of said supporting member and extending forwardly and backwardly thereof, plungers reciprocally mounted in the tubular portions at the opposite ends of said supporting member and extending through each of the tubular portions, compression springs positioned in each of said tubular portions around said plungers and so arranged that the springs in the tubular portions at the outer sides of the supporting member will yield under slight impact and that both the springs at each end of the supporting member will yield under more severe impact, caps reciprocally mounted over the outer ends of the tubular portions extending outwardly from said supporting member, said plungers being secured at their outer ends to said caps, and a bumper member pivotally mounted on said caps.

5. In an automobile bumper structure, a yieldably mounted bumper member of rigid construction and provided with fin ends, and rubber strips secured to the front side of said bumper member and extending longitudinally therewith.

6. In an automobile bumper structure, in combination, a shock absorber member comprising a portion rigidly secured to the automobile, a portion pivotally secured to a bumper member and telescopically mounted over said first portion, an axially extending guide member secured to said second portion and slidable through said first portion, a first spring in initial engagement with said guide member, and a second spring jointly engaged by said guide member after an initial movement thereof.

In testimony whereof, I have hereunto set my hand at San Diego, California, this 28 day of July 1926.

ELISHA A. GATES.